United States Patent
Raju

(10) Patent No.: US 12,173,833 B2
(45) Date of Patent: Dec. 24, 2024

(54) VOLUMETRIC FLOW DESIGN FOR CONDUITS

(71) Applicant: Seshadri Raju, Jackson, MS (US)

(72) Inventor: Seshadri Raju, Jackson, MS (US)

( * ) Notice: Subject to any disclaimer, the term of this patent is extended or adjusted under 35 U.S.C. 154(b) by 202 days.

(21) Appl. No.: 17/817,559

(22) Filed: Aug. 4, 2022

(65) Prior Publication Data
US 2023/0070379 A1     Mar. 9, 2023

Related U.S. Application Data

(63) Continuation of application No. PCT/US2021/071125, filed on Aug. 5, 2021.

(51) Int. Cl.
*F16L 9/00*     (2006.01)
*F15D 1/04*     (2006.01)

(52) U.S. Cl.
CPC ............... *F16L 9/006* (2013.01); *F15D 1/04* (2013.01)

(58) Field of Classification Search
CPC ................................. F16L 9/006; A61F 2/82
USPC ............................ 138/39, 177, 178, DIG. 11
See application file for complete search history.

(56) References Cited

U.S. PATENT DOCUMENTS

| | | | |
|---|---|---|---|
| 5,083,429 A | 1/1992 | Veres et al. | |
| 5,743,301 A * | 4/1998 | Winship | B21J 5/08 138/109 |
| 8,753,505 B2 * | 6/2014 | Sprague | B01F 25/4335 210/150 |
| 9,869,082 B1 | 1/2018 | Mann | |
| 2006/0122575 A1 | 6/2006 | Wakabayashi | |
| 2007/0219333 A1 | 9/2007 | Shimono et al. | |
| 2008/0092975 A1 * | 4/2008 | Grimes | F16L 43/001 285/179 |
| 2012/0318394 A1 | 12/2012 | Hu et al. | |
| 2013/0255813 A1 * | 10/2013 | Auclair | B60H 1/00571 138/26 |

FOREIGN PATENT DOCUMENTS

WO   WO 2020/163542   8/2020

OTHER PUBLICATIONS

PCT/US/2021/071125—see the Written Opinion of the International Searching Authority (dated Nov. 4, 2021), International Search Report (dated Nov. 4, 2021).
Nandagopal, N.S., Practical Process Plant Layout and Piping Design, Engineering Institute of Technology, Fundamentals of Process Plant Layout and Piping Design (article) Chapter 7.1, Version 5.1, 2011, accessed Jul. 8, 2024. https://www.eit.edu.au/resources/fundamentals-of-process-plant-layout-and-piping-design/?_gl=1%2A124swwx%2A_up%2AMQ..%2A_ga%2AMTYxMjU4MDk3LjE3MjAONTMxMTM.%2A_ga_5JFFK72DLM%.

* cited by examiner

*Primary Examiner* — Patrick F Brinson
(74) *Attorney, Agent, or Firm* — Intellectual Property Consulting, LLC; Bernard F. Meroney

(57)     ABSTRACT

An improved flow conduit with gradually expanding caliber is described, where the conduit radius r grows with conduit length 1 so that the conductance remains constant or $r^4/l$ is constant, or alternatively, where the flow is near constant conductance flow, where or $r^n/l$ is constant, where n>4. The radius can expand over a portion of the conduit.

20 Claims, 8 Drawing Sheets

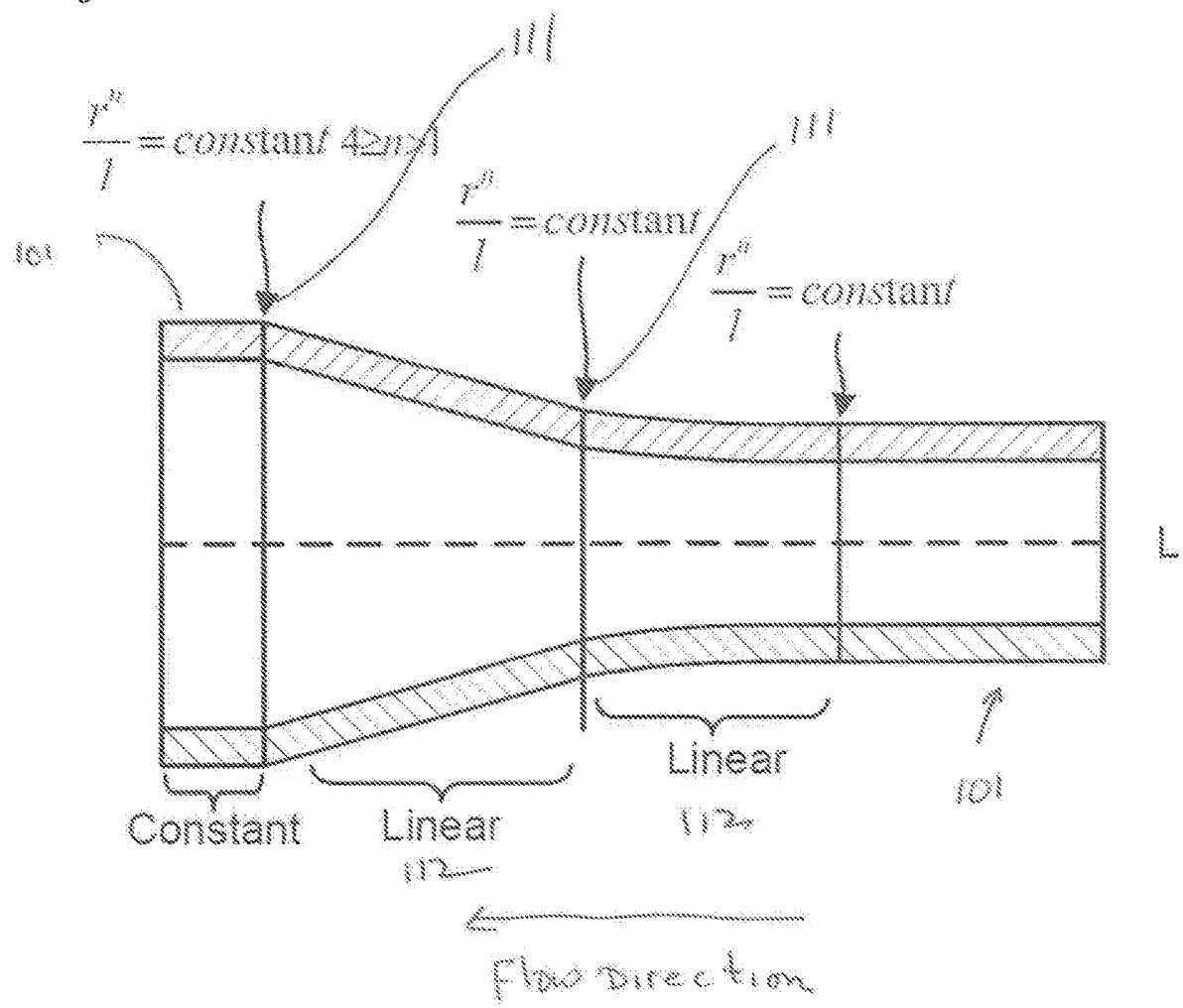

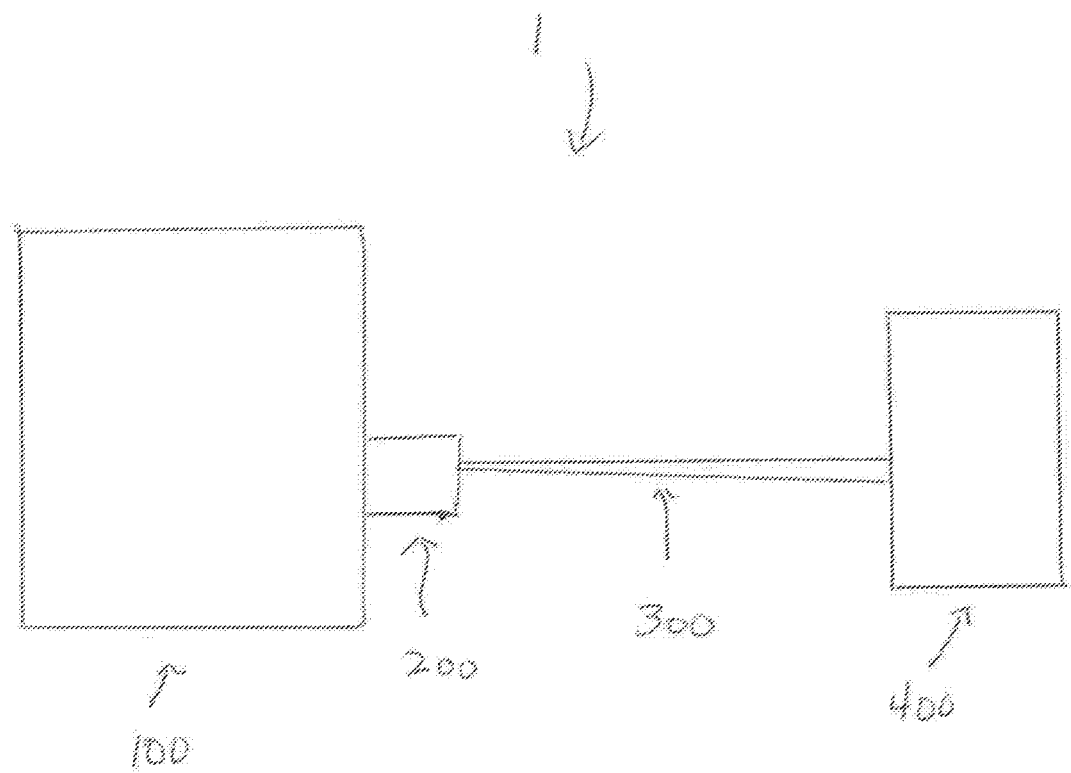

VOLUMETRIC FLOW DESIGN FOR CONDUITS

PRIORITY CLAIM

This application is a continuation of PCT/US21/71125 filed on Aug. 5, 2021, the contents of which are incorporated by reference.

BACKGROUND OF THE INVENTION

Conduits or pipes 300 are routinely used to deliver fluids from a pressurize delivery system, 1, where a pump, vacuum pump, or gravity flow is the source of pressure 200 from a source of fluid, such as a fluid storage unit 100 (such as a tank or fluid processing equipment), to a use device 300 where the fluids can be utilized, processed, or stored (for instance, a distillation column in a chemical plant). See FIG. 5. Fluid systems are commonplace, such as in fuel delivery systems, brake systems, and other mechanical systems where the delivery device uses the delivered fluids to perform a mechanical function. (such as a piston chamber being the device and the fluids move a piston; or the delivery device is a fuel injector). Various examples include chemical processing plants, such as hydrocarbon processing, industrial plant applications, such as hydraulic controls, water delivery, processing and storage systems, and food processing plants, such as milk, soda or spirits processing. Indeed, many devices can also function a source of fluids, for further downstream processing using conduit piping.

Fluid delivery systems typically are typically designed using a cylindrical tube conduit with uniform caliber. However, in this design, the flow rate or rate of delivery of fluids, will vary with the length of the conduit. And consequently, the size of the pump, if employed, must account for the length of the conduit to provide the desired flow rate at the terminus of the conduit. A new design is needed to help overcome this limitation. The pipes can be transporting a gas or a liquid.

SUMMARY OF THE INVENTION

A conduit with gradually expanding caliber is described, where the conduit radius r grows with conduit length l so that $r=K^n\sqrt{l}$, where K is a constant, or alternatively, where $r^n/l=K$ where K is a constant, and $n>1$. In a system where fluid is driven by pressure differences with laminar flow, such a conduit shows substantial improvement in flow over the cylindrical conduit with constant radius and may be an advantage in low volume/velocity flows due to poor inflow/outflow characteristics. The conduit system can contain one or more such expanding conduits.

BRIEF DESCRIPTION OF THE DRAWINGS

FIG. 2A-1 is a set of bar graphs depicting flow through expanding R4 conduits versus flow through constant diameter conduits in the experimental setup of FIG. 1 where the initial pressure was 25 mmHg and conduit length was 160 mm.

FIG. 2A-2 is a set of bar graphs depicting flow through expanding R4 conduits versus flow through constant diameter conduits in the experimental setup of FIG. 1 where the initial pressure was 10 mmHg and conduit length was 160 mm.

FIG. 2B-1 is a set of bar graphs depicting flow through expanding conduits in the experimental setup of FIG. 1 where the initial pressure was 10 mmHg and conduit length was 310 mm.

FIG. 2B-2 is a set of bar graphs comparing flow of constant diameter flow R versus R4, R5 and R6 flow in the setup of FIG. 1 with no air trap through grafts of various diameters where the initial pressure was 10 mmHg and conduit length was 620 mm.

FIG. 4 is a cross section through a conduit with three radii of Rn at three separated lengths and linear radius growth with length between the Rn growth. The conduit has a starting and ending section of constant diameter.

FIG. 5 is an illustration of a general pressurized fluid delivery system including an expanding conduit.

DESCRIPTION OF THE PREFERRED EMBODIMENTS

Theoretical Formulation

Figure 1:
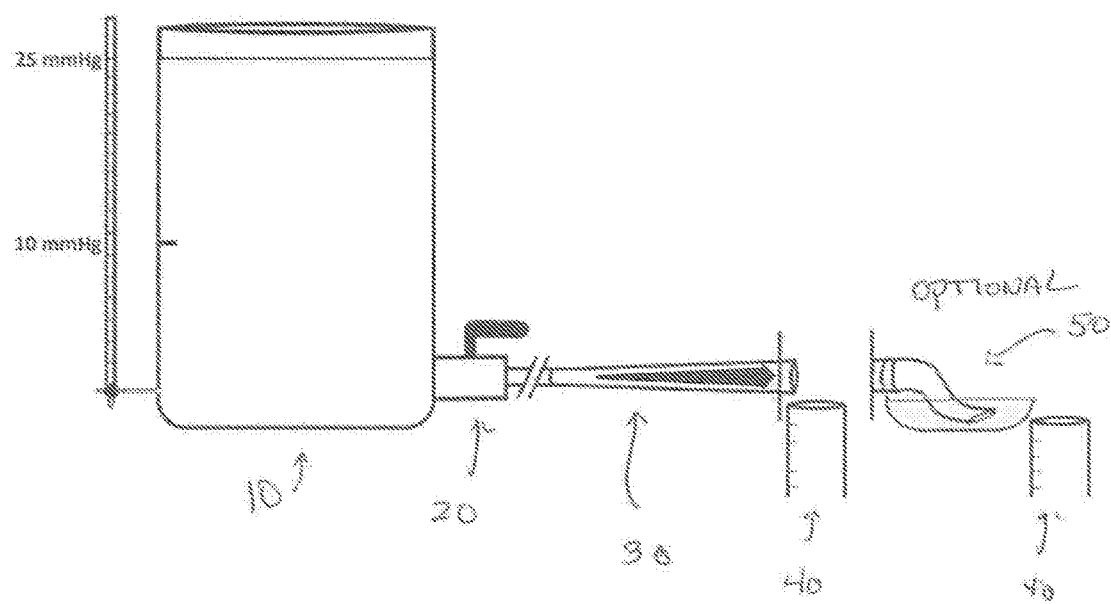
FIG. 1 is an illustration of a side view of the experimental system used to test the output of an expanding conduit.

Laminar flow in pressure driven systems is described by the Poiseuille equation: Fluid flow, $Q=\Delta P/R$ where $1/R$ is known as the conductance and where $R=8\eta L/\pi r^4$ and where $\mu$ is the fluid viscosity.

Rearranging, and combining the two equations:

$$Q=\Delta P*(\pi/8)*(r^4/L)*l/\eta).$$

where Q is the volumetric flow rate, L is the length of the conduit measured from the start of the conduit, r is the radius of the conduit, its length l, $\eta$ is the fluid viscosity, and $\Delta P$ is the change in pressure across the length L of the conduit. For a given pressure gradient, the flow rate is governed by three coefficients, known respectively as the numeric, geometric, and viscosity factors. The numeric factor is fixed, and viscosity is a constant in the near term. The geometric factor is the variable (resistance or conductance), controlling flow in most hydraulic and mechanical situations, as the pressure gradient is more often fixed by a pump or a fluid column height for gravity driven systems. The geometric factor is notable in that the conduit radius enters it in the fourth power in the numerator. This is offset by the length of the conduit in the first power in the denominator. The volumetric flow in traditional cylindrical conduits will gradually decline with length due to linear increase in flow resistance with length. We hypothesized that the linear resistance can be partially compensated by a relatively small increase in conduit radius with conduit length. The preferred offset is to increase the radius per each successive length so that $r^4/l$ remains constant (constant conductance growth) and equal to the first cm of the conduit (over the first cm the radius is preferably constant). In other words, the radius of the conduit grows as the $4^{th}$ root of length l, or $r=\sqrt[4]{(Kl,)}$ where l is preferably measured from the start of the conduit, and k is a constant. That is, the conduit expands so that the conduit conductance remains a constant. Fabrication of a conduit according to this specification (the low-pressure side of the conduit is larger than the high-pressure side of the conduit) will yield a gradually expanding tube that will double its radius at 16 cm length. (where the unit of measurement is cm). In many applications, this R4 growth (e.g., $r^4/l$ is constant) is too quick, resulting in an end radius that is too large for the application. In such circumstances, a more practical formulation is to keep $r^5/l$ or even $r^6/l$ or $r^7/l$ or $r^n$, n>4 all ("near constant conductance growth") constant over the length of the conduit after the first cm. This will yield longer tube lengths before the radius doubles (Table 1). This is true for all selected measurement units, such as meters. The volumetric flow in R4, R5, or R6 growth will be less than that for constant conductance flow (R4 growth), i.e., $r^4/l$ constant, over the length of the conduit, but is still better (greater than) than flows from a uniform radius cylinder. All such conduits provide improved increased volumetric flows overflows from a constant diameter conduit. Longer length conduits may be needed for certain applications. The fractional constants necessary for the various radius exponents vs length are shown in Table 2 for a number of selected initial calibers.

TABLE 1

Conduit radius increase with length

| Constant Variable | Length at which $R_{initial}$ doubles (measurement unit) |
|---|---|
| $\dfrac{r^2}{L}$ | 4 |
| $\dfrac{r^3}{L}$ | 8 |
| $\dfrac{r^4}{L}$ | 16 |
| $\dfrac{r^5}{L}$ | 32 |
| $\dfrac{r^6}{L}$ | 64 |

TABLE 2

Initial and end diameter of uniform cylindrical conduit and test conduits

| Constant Geometric Factor | Initial Diameter (mm) | Ending Diameter at L = 160 mm (mm) | Ending Diameter at L = 310 mm (mm) | Ending Diameter at L = 620 mm (mm) |
|---|---|---|---|---|
| r | 4 | 4.00 | 4.00 | 4.00 |
|   | 6 | 6.00 | 6.00 | 6.00 |
|   | 8 | 8.00 | 8.00 | 8.00 |
|   | 10 | 10.00 | 10.00 | 10.00 |
| $\dfrac{r^4}{L}$ | 4 | 8.00 | 9.44 | 11.22 |
|   | 6 | 12.00 | 14.16 | 16.84 |
|   | 8 | 16.00 | 18.88 | 22.45 |
|   | 10 | 20.00 | 23.60 | 28.10 |
| $\dfrac{r^5}{L}$ | 4 | 6.96 | 7.95 | 9.13 |
|   | 6 | 10.45 | 11.92 | 13.70 |
|   | 8 | 13.93 | 15.90 | 18.26 |
|   | 10 | 17.41 | 19.87 | 22.83 |

TABLE 2-continued

Initial and end diameter of uniform cylindrical conduit and test conduits

| Constant Geometric Factor | Initial Diameter (mm) | Ending Diameter at L = 160 mm (mm) | Ending Diameter at L = 310 mm (mm) | Ending Diameter at L = 620 mm (mm) |
|---|---|---|---|---|
| $\dfrac{r^6}{L}$ | 4 | 6.35 | 7.09 | 7.96 |
|   | 6 | 9.52 | 10.63 | 11.94 |
|   | 8 | 12.70 | 14.18 | 15.92 |
|   | 10 | 15.87 | 17.72 | 19.89 |

Fabrication of Experimental Conduits

To demonstrate performance of slow growth conduit radius, the following experiment was done. The conduit designs were designed using engineering software (Autodesk, Inc.; San Rafael, CA) and fabricated in a commercial 3D printer (Stratasys; Eden Prairie, MN).

Flow Test Bed—Experimental Model

The basic flow model consisted of a source of fluid; here, a tank 10 with outflow controlled by a calibrated ball valve 20 (FIG. 1). The ball valve was kept open at the same setting for all flows. The various conduits 30 tested were connected to the ball valve 20. Each conduit 30 was an expanding conduit with an initial starting length, here 1 cm, where the radius was constant. The constant starting radius allows flow from the pressurized system to stabilize before entering the expanding section 30. It also avoids the ambiguity of evaluating rn/l as 1→0. Conduit outflow was open to the atmosphere (open system) and was allowed to drain into a graduated cylinder 40 for timed measurement (cc/minute). In some optional experiments, a partially closed system of drainage was used. The conduits were connected to a short Penrose drain 50 (Diameter=3.5 cm; Length=13 cm) discharging under the fluid level in a shallow pan before emptying into the output cylinder (optional, FIG. 1). The Penrose drain 50 prevented air from entering the conduit at the discharge end, functioning similarly to the Heimlich valve. The tank system A was filled with a 2:3 mixture of glycerol and water with a viscosity of 0.04 poise. Each flow measurement is an average of 5 runs or trials.

Figures 1, 2A:
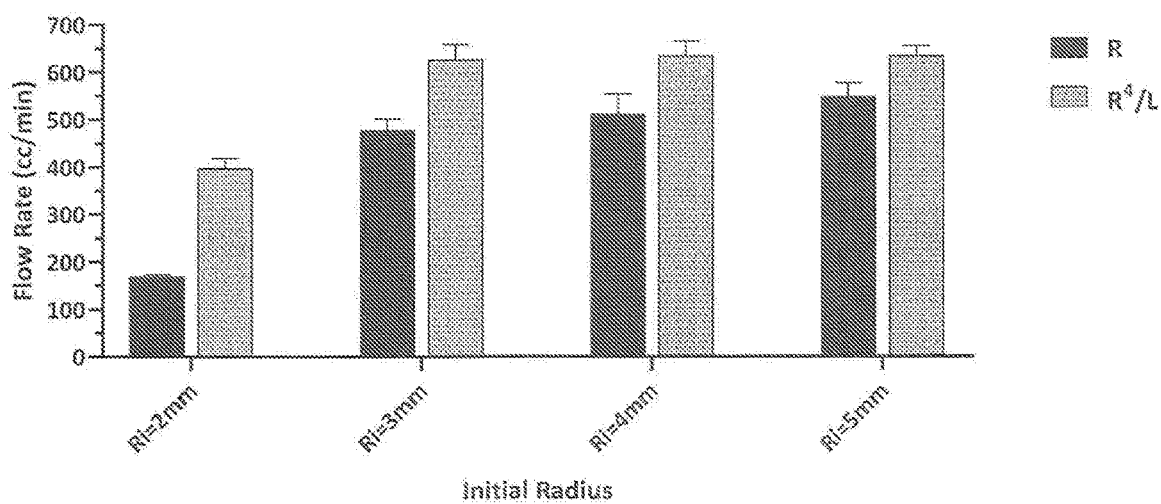
Figures 2, 2A:
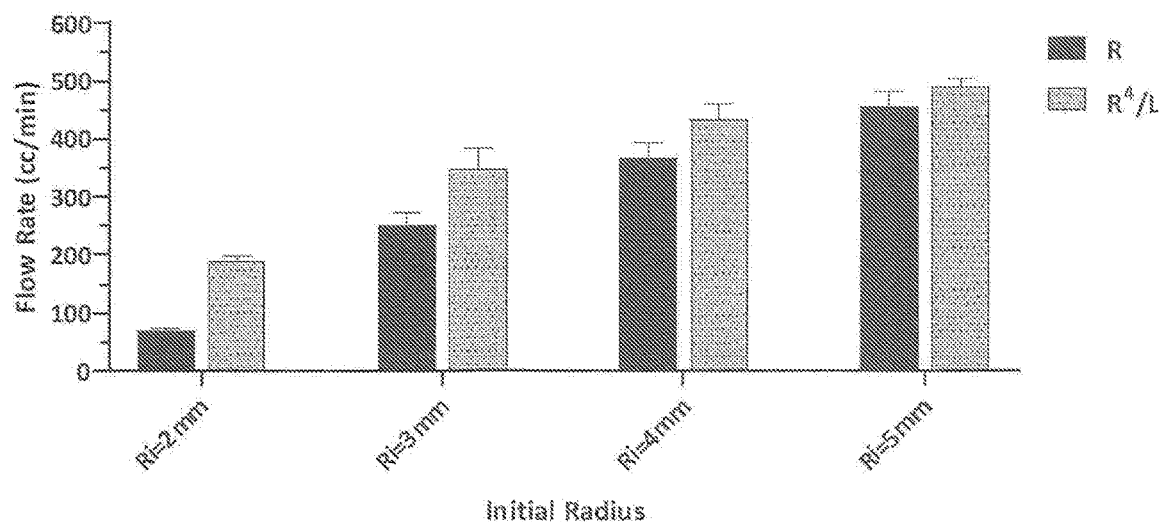
Figures 1, 2B:
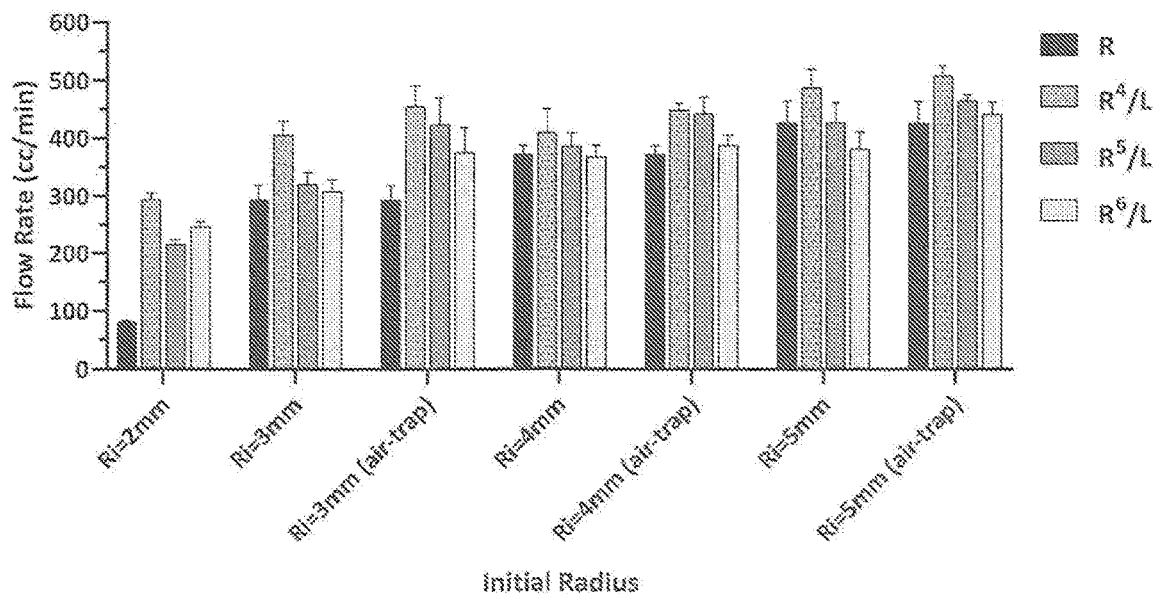
Figures 2, 2B:
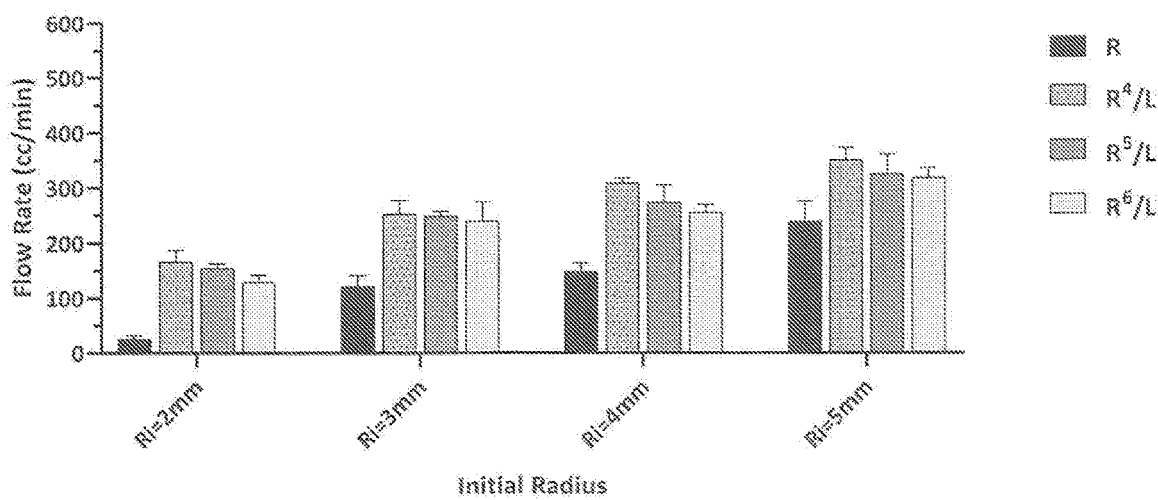

As shown in the bar charts of FIGS. 2A-1 and 2A-2, the flow rate of a constant diameter conduit is always less than that of the expanding R4 growth conduits for two different starting pressures. As shown in FIGS. 2B-1 and 2B-2, for all lengths tested (310 mm, 620 mm) and all starting radii tested of 2 mm, 3 mm, 4 mm, and 5 mm, all expanding conduit flows are greater than constant diameter (R0) flows (constant diameter). As expected, flow rates with $r=K^4\sqrt{l}$ were greater than where $r=K^5\sqrt{l}$, which was greater than flow rates where $r=K^6\sqrt{l}$ and all were greater than R0 (uniform diameter).

Results

Figure 3:
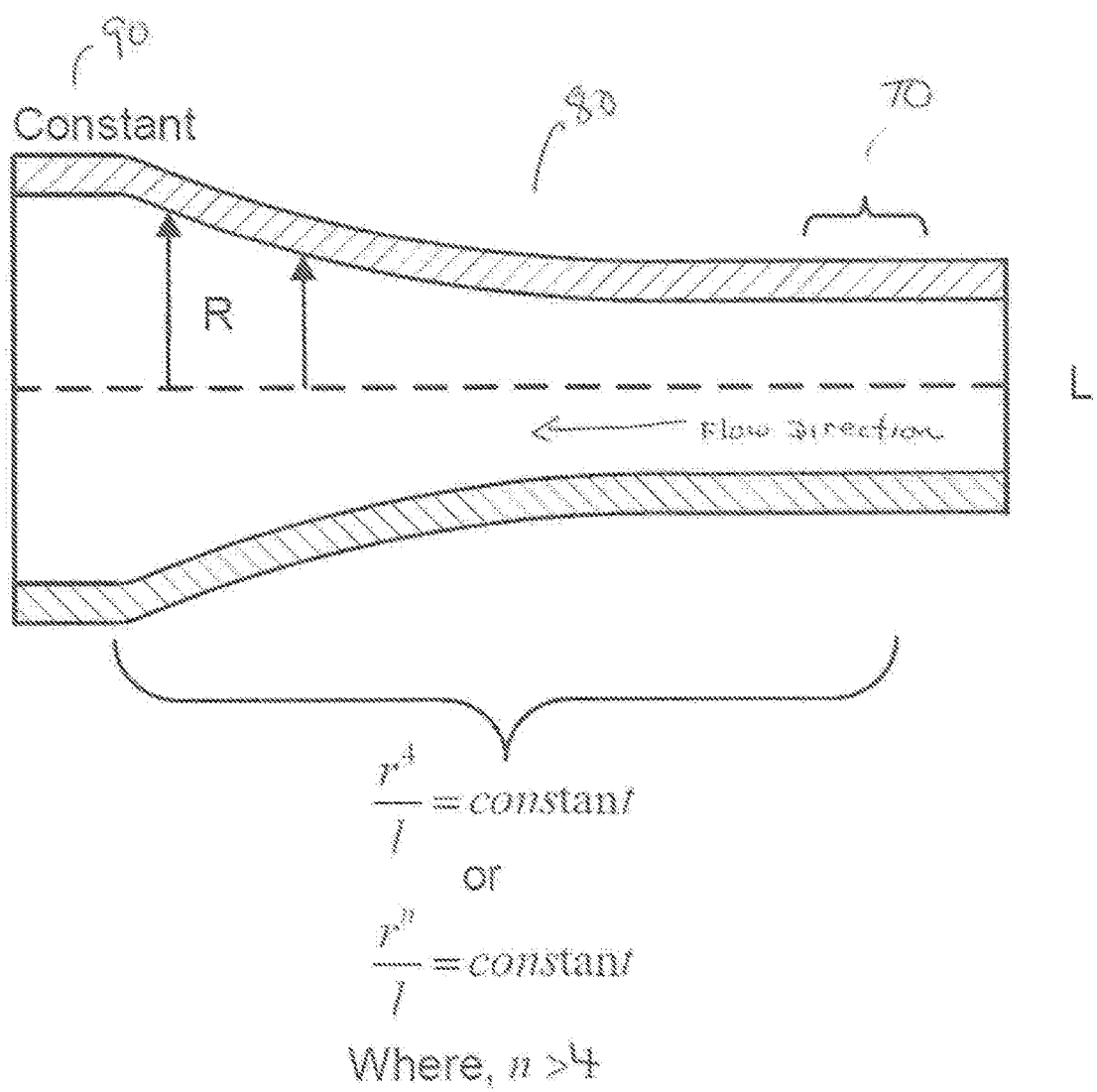
FIG. 3 is an illustration of a cross section through an expanding conduit.

The flow rates of expanding caliber conduits ($r^{4\neq}$) compared to traditional cylindrical conduits are shown in Table 3 and FIGS. 2B-1 and 2B-2. The expanded caliber yields a significantly improved flow from 14% to 563% in all but a few instances. In the latter instances, the outflow stream was observed to be separated from part of the tube outlet circumference, suggesting flow separation from the wall (i.e., the flow was no longer laminar for some length near the outflow end). This problem was substantially reduced when the Penrose air-trap 50 Was used (Table 4). The air trap 50 restricts the flow of air into the conduit at the discharge end, more closely simulating a closed pipe system. In closed pipe flow where the fluid completely fills the pipe and flow is driven by a pressure gradient, the incidence of transition to non-laminar flow should be reduced, as in an expanding pipe, the fluid velocity declines with conduit length.

expanding conduit is shown in FIG. 3, with constant radius sections 70 at the beginning and 90 the end of the conduit, and an expanding section 80 therebetween.

TABLE 3

Mean conduit flow rate when R, $R^4/L$, $R^5/L$, and $R^6/L$ are held constant (no air-trap)

| Conduit Length (mm) | Initial Radius (mm) | Constant Radius Flow (cc/min) | Constant $R^4/L$ Flow (cc/min) (% improvement) | Constant $R^5/L$ Flow (cc/min) (% improvement) | Constant $R^6/L$ Flow (cc/min) (% improvement) |
|---|---|---|---|---|---|
| \multicolumn{6}{c}{Input Pressure = 10 mmHg} ||||||
| 160 | 2 | 71 | 188 (+165%***) | — | — |
|  | 3 | 251 | 349 (+39%***) | — | — |
|  | 4 | 368 | 435 (+18%**) | — | — |
|  | 5 | 458 | 492 (+7%) | — | — |
| 310 | 2 | 81 | 294 (+263%***) | 216 (+167%***) | 247 (+205%***) |
|  | 3 | 294 | 406 (+38%***) | 321 (+9%) | 308 (+5%) |
|  | 4 | 373 | 411 (+10%) | 387 (+4%) | 369 (−1%) |
|  | 5 | 428 | 489 (+14%*) | 428 (0%) | 383 (−11%) |
| 620 | 2 | 26 | 166 (+538%***) | 154 (+492%***) | 129 (+396%***) |
|  | 3 | 122 | 253 (+107%***) | 249 (+104%***) | 240 (+97%***) |
|  | 4 | 149 | 310 (+108%***) | 275 (+85%***) | 256 (+72%***) |
|  | 5 | 240 | 352 (+47%***) | 327 (+36%**) | 320 (+33%**) |
| \multicolumn{6}{c}{Input Pressure = 25 mmHg} ||||||
| 160 | 2 | 169 | 398 (+136%***) | — | — |
|  | 3 | 478 | 628 (+31%***) | — | — |
|  | 4 | 513 | 636 (+24%***) | — | — |
|  | 5 | 550 | 637 (+16%***) | — | — |
| 310 | 2 | 157 | 427 (+172%***) | 301 (+92%***) | 285 (+82%***) |
|  | 3 | 401 | 512 (+28%***) | 377 (−6%) | 386 (−4%) |
|  | 4 | 475 | 575 (+21%***) | 447 (−6%) | 487 (+3%) |
|  | 5 | 549 | 662 (+21%**) | 491 (−11%*) | 520 (−5%) |
| 620 | 2 | 68 | 451 (+563%***) | 364 (+435%***) | 301 (+343%***) |
|  | 3 | 267 | 520 (+95%***) | 476 (+78%***) | 433 (+62%***) |
|  | 4 | 403 | 551 (+37%***) | 504 (+25%***) | 509 (+26%***) |
|  | 5 | 503 | 632 (+26%**) | 592 (+18%***) | 522 (+4%) |

*P < 0.05 vs. constant radius flow
**P < 0.01 vs. constant radius flow
***P < 0.001 vs. constant radius flow

TABLE 4

Mean conduit flow rate with and without Penrose air-trap (conduit length = 310 mm)

| Initial Radius (mm) | Constant R Flow[a] (cc/min) | Constant $R^4/L$ Flow (cc/min, %) | Constant $R^4/L$ + air-trap Flow (cc/min, %) | Constant $R^5/L$ Flow (cc/min, %) | Constant $R^5/L$ + air-trap Flow (cc/min, %) | Constant $R^6/L$ Flow (cc/min, %) | Constant $R^6/L$ + air-trap Flow (cc/min, %) |
|---|---|---|---|---|---|---|---|
| \multicolumn{8}{c}{Input Pressure = 10 mmHg} ||||||||
| 3 | 294 | 406 (+38%***) | 456 (+55%***) | 321 (+9%) | 424 (+44%***) | 308 (+5%) | 376 (+28%**) |
| 4 | 373 | 411 (+10%) | 450 (+21%***) | 387 (+4%) | 444 (+19%***) | 369 (−1%) | 389 (+4%) |
| 5 | 428 | 489 (+14%*) | 500 (+17%*) | 428 (0%) | 467 (+9%*) | 383 (−11%) | 443 (+4%) |
| \multicolumn{8}{c}{Input Pressure = 25 mmHg} ||||||||
| 3 | 401 | 512 (+28%***) | 570 (+42%***) | 377 (−6%) | 553 (+38%***) | 386 (−4%) | 449 (+12%*) |
| 4 | 475 | 575 (+21%***) | 602 (+27%**) | 447 (−6%) | 566 (+19%**) | 487 (+3%) | 505 (+6%) |
| 5 | 549 | 662 (+21%**) | 638 (+16%**) | 491 (−11%*) | 602 (+10%**) | 520 (−5%) | 553 (+1%) |

*P < 0.05 vs. constant radius flow
**P < 0.01 vs. constant radius flow
***P < 0.001 vs. constant radius flow
[a]Flow separation did not occur in the constant radius conduits; Penrose air-traps did not affect these flows.

DISCUSSION

Accretive manufacturing (3-D printing) makes it much easier to fabricate expanding small caliber conduits for mechanical or other systems. A cross section through an expanding conduit is shown in FIG. 3, with constant radius sections 70 at the beginning and 90 the end of the conduit, and an expanding section 80 therebetween.

There is a practical limit to the length of the conduit depending upon location and use. Examination of Table 1 (length of conduit when initial radius doubles) and Table 3 (measured flow rates for the conduits tested without an air trap) suggests that up to ≈16 cm is practical for designs keeping $r^4/L$ constant. As shown in Table 5, for conduits of 14 mm diameter, the ending radius is calculated for various length conduits for different RN growth (e.g. $r^N/l$=constant=K, where N=4, 5, or 6. For large diameter conduits, the change in radius will be small, and R4 growth, or even faster growth, such as R3 or R2 growth could be utilized if faster fluid flows are desired.

TABLE 5

Expanding caliber configuration

| Length (cm) | Constant $R^4/L$ Radius (mm) | Constant $R^5/L$ Radius (mm) | Constant $R^6/L$ Radius (mm) |
| --- | --- | --- | --- |
| 0 | 14.00 | 14.00 | 14.00 |
| 1 | 14.00 | 14.00 | 14.00 |
| 2 | 16.65 | 16.08 | 15.71 |
| 3 | 18.43 | 17.44 | 16.81 |
| 4 | 19.80 | 18.47 | 17.64 |
| 5 | 20.93 | 19.32 | 18.31 |
| 6 | 21.91 | 20.03 | 18.87 |
| 7 | 22.77 | 20.66 | 19.36 |
| 8 | 23.55 | 21.22 | 19.80 |
| 9 | 24.25 | 21.73 | 20.19 |
| 10 | 24.90 | 22.19 | 20.55 |
| 11 | 25.50 | 22.62 | 20.88 |
| 12 | 26.06 | 23.01 | 21.18 |
| 13 | 26.58 | 23.38 | 21.47 |
| 14 | 27.08 | 23.73 | 21.73 |
| 15 | 27.55 | 24.06 | 21.99 |

(all conduits having an initial starting length (1 cm) of constant radius)

Longer conduits may be required for particular applications, including fluid processing applications, and are possible keeping $r^6/L$ or $r^7/L$ or higher r values constant. Fabrication techniques described above or known to those of ordinary skill in the art may be used to construct the conduit. Flow separation/cavitation should not be a problem in closed flows of small caliber.

Applications

Conduits are the circulating system of modern industry that includes engines, machinery, hydraulic systems, processing systems and evolving 'green' systems based on batteries. These conduits carry fluid of all kinds: fuel, coolants, lubricants, chemicals, liquid consumables, hydraulic fluids, etc. See FIG. 5. Shown is a pump source of fluids 100, and a source of pressure 200 delivering pressurized fluid to a conduit system having at least one n expanding conduit 300, which terminates in a use device 400 that uses or processes the fluid. The expanded configuration conduit 300 may be more efficient than the traditional cylindrical design in those applications where the fluid/liquid behaves subject to Poiseuille Flow Equation.

In many applications, there is greater flexibility in designing adequate power input to maintain flow; the ability to adjust input pressure, base caliber, and length to suit the flow demand is an advantage. The base caliber/length of the conduit in combination with designing the pressure drops can be designed for optimal performance without turbulence. In a partially closed flow system like the one used in the flow model; a Pascal air trap may be preferred to prevent flow separation in the conduit. More often, in mechanical systems, flow is closed pipe flow, where the fluid fills the pipe, and the drive is a pressure drive. In such closed pipe systems, a change from laminar to chaotic flow is unlikely in the expanded conduit section as with increasing pipe diameter the fluid velocity decreases with conduit length. In a mechanical system conduit, the conduit may have constant diameter R0 front section, such as of a unit length system length (e.g., 1 cm if measurement system is cm), (to help establish the laminar flow), followed by an expanding diameter section and possibly other constant diameter sections. In this case, the constant diameter growth factor for Rn growth, (i.e., $r''/l$ is constant) will be (R0''/unit length=constant).

Where the conduit system is a series of pipes, which is more often than not, the entire system can emulate a constant Rn growth for the chosen n, or at least one portion of the system, or even a single pipe, can be a growth section. For instance, in a two-pipe system, both growth sections, if the ending radius of the first pipe is R1, at length L1, then the starting radius in the growth section of a second pipe is R1. With the chosen growth factor Rn for the system, e.g., r4, r5, r6 etc., the second conduit grows so that $r''/L$ is constant, where L is measured preferably from the start of the first pipe, and the constant is the same as the first pipe, such as R1''/L1 (since each length of the first pipe and associated radius, satisfies the same relationship and same constant). Note, in the two-conduit system, both pipes can be growth pipes, with different growth factors; or a single conduit can be a growth conduit, and the other a constant diameter system. In multiple conduit systems, the growth can be over the entire system, or in portions or parts of the system, with different growth factor (R4,R5, etc). Note, for threaded pipes, there may be ending and starting sections where the radius is constant, to provide for threading of the conduits for joining. For instance, if the constant will be R1''/L1, or R0''/unit length, assuming the first pipe has an initial constant radius R0 over the first unit length of pipe. These dual or longer section conduits can be used where very long length conduits are needed, and it is easier to build Rn growth in pipe sections. In this fashion, the end radius of the conduit can be chosen to fit the end application device (for instance, an engine fuel injector), and the length of the constant flow section is chosen to provide the needed flow rate to the injector, or if the length is set, chose the Rn growth to provide the desired ending radius over the system set length. Note, the "n" in Rn growth (e.g., where $r''/l$ is constant) does not have to be an integer. Applications can also have a first portion of conduit that grows at a first growth factor, followed by a second portion that grows at a different growth factor. Preferably, overall growth is monotonic.

Additionally, Rn growth can be approximated. For instance, a pipe can have a series of lengths Li, where the associated radii, Ri 110, is such that $Ri''/Li$ is constant. Between these radii Ri, the radius growth 112 can be linear with length. See FIG. 4, including constant radius sections 101 at the start and end of the conduit. Alternatively, the growth can be step up growth, where the resulting system appears as a staircase step up in growth over the length. Preferably, overall, monotonic growth is preferred.

As will be understood by one of skill in the art, as $r''/l=K$ (constant, then $r=\sqrt[4]{(Kl)}$ over the entire growth region, so K=r0/L0, where ro is the radius at the start of the growth region, where it is preferred that L is measured from the start of the conduit system, not the start of the expanding conduit) or "near constant conductance" flow or growth conduits s, e.g., $r''/l$ is constant, where n>4 or 1<n<4 flow can have endless applications where the flow rate to the end application is an important factor to the functioning of the mechanical or other system. Note, flow rates where 1<n<4 are greater than flow rates for n≥4, however, radius growth rates are also faster than constant conductance flow R4 growth.

The expanding conduit section allows for use of smaller pressure drives, such as pumps or vacuum pumps or sources (fuel pumps in the example above, or common straws, where a suction is provided by the drinker) as the loss of flow with length is partially compensated by the expanding conduit.

It may be useful in a mechanical system to have only a section of the conduit as an expanding conduit, for instance, in a conduit that splits, it may be beneficial to use expansion before the conduit splits, to set the flow rate in each split conduit. Note, in a splitting conduit the split conduits will generally drop down in starting radius, e.g., non-monotonic growth at the split. The expanding conduit provides additional design choices. The expansion can be over a portion of the run, or the entire conduit run, and different portions of the run can have different expansion growths (such as in a flow path split). The conduit can be designed by selection of the starting and ending diameters and length and solving for the growth factor that best fits. Particularly noting that in RN growth, N does not have to be an integer, and indeed, N can represent a polynomial of degree N (if N is an integer). Alternatively, the ending flow or pressure may be selected with a given length, and the best growth factor chosen to produce such. This can be modified if the ending diameter is not workable. The expanding pipe provides the fluid system designer additional options, such as modifying delivery flows and delivery pressures with modifications to the delivery conduit(s). The pressure source can be modified (e.g., smaller pump) by using an expanding pipe.

As indicated, the expansion in a portion can be continuous, piecewise, or even stepwise expansion. As mentioned, the conduit can have multiple growth sections, and multiple sections where the radius is constant. It is preferred that the growth be monotonic, but at the end of a run of conduit, or at a split in the run, a stepdown in growth may be necessary for the given application. Where the run splits, each run may grow also, at the same or different growth factors, where the length L for the split runs can be measured at the start of the split. Both liquids and gases, and some flowable solids (such as ice cream) are fluids for purposes of the application, as long as the flow is laminar flow.

Measurement of L in a Growth Section

As described, it is preferred that in a growth section where $R^N/L$ is constant, that L is measured from the beginning of the conduit system. If you measure the length from the start of the growth conduit, then the growth in this case is not identical to that when length is measured from the start of the system. This occurs because $r=\sqrt[n]{(Kl)}$ in the growth section. The radius is smaller in a growth section when L is measured from the start of the conduit system. Note also that the growth constant K is a different value in the two systems, as $K=(rs)^n/Ls$, where rs is the radius at the start of the growth section, and Ls is the conduit length at the start of the growth section.

As an example, consider a two-conduit system, each 10 cm length, with a 1 cm overlap, where the first conduit is constant, radius of 2 cm, the second conduit grows at R4 after the 1 cm overlap.

conduit, with an understanding of the length of the conduit system prior to the conduit in question. Measuring L from the start of the conduit system more closely emulates a single conduit system, particularly in performance.

You can build a conduit system using growth conduit sections where the growth is referenced from the start of the growth conduit. Such a conduit system will have different growth profile and different performance characteristics than one where length L is measured from the system start. Care should be taken understanding length measurement based on which system was used.

The invention claimed is:

1. In a pressure driven fluid system having a tubular pipe run for laminar fluid flow, the tubular pipe-run comprising one or more pipes, each pipe having self-supporting sidewalls, a radius ri at each length li of the tubular pipe run, where the tubular pipe run has a portion of the pipe run where radius ri grows with pipe length, so the that the radius ri at each pipe length li in the portion is such that $(ri)^N/li$ is a constant, where $N>1$.

2. The system of claim 1 where N=4.

3. The system of claim 1 where N>4.

4. The system of claim 1, where li is measured from a start of the start of the pipe run.

5. The system of claim 1 where the portion comprises the length of the pipe, less an initial starting length.

6. A fluid transport system with laminar flow comprising a source of fluid, a source of pressure, and a use device; a tubular conduit system of at least one conduit connecting the source of fluid to the use device, where the tubular conduit system comprises a radius r at each point l of a length of the tubular conduit system, where the tubular conduit system has a portion in at least one of said at least one conduits, where the radius r grows with conduit length, so the that the radius r at each conduit length l in the portion is such that $(r)^N/l$ is a constant, where $N>1$.

7. The fluid transport system of claim 6 where N=4.

8. The fluid transport system of claim 6, where l in said portion is measured from a start of the tubular conduit system.

9. The fluid transport system of claim 6 where the source of pressure comprises a pump.

10. The fluid transport system of claim 6 where the source of pressure comprises a vacuum source.

11. The fluid transport system of claim 6 where the source of pressure comprises a fluid column.

12. The fluid transport system of claim 6, where the use device is a chemical processing unit.

13. The fluid transport system of claim 6, where the use delivery is a liquid food processing device.

14. The fluid transport system of claim 6, where the use device is a mechanical device.

15. The fluid transport system of claim 6, where the source of fluid is a source of hydraulic fluid.

| L = 0 at beginning of system | L = 0 at start of growth conduit |
|---|---|
| $K = 2^4/10 = 1.6$ | $K = 2^4/1 = 16$ |
| length at end of second conduit = 19 | length at end of second conduit = 10 |
| (radius at L = 19) = $\sqrt[4]{KL} = \sqrt[4]{1.6 * 19} = 2.34$ | radius at L = 10) ) = $\sqrt[4]{KL} = \sqrt[4]{16 * 10} = 3.55$ |

Clearly, the two measurements of L result in a different growth profile.

Measuring L in a growth section from the start of the conduit in a growth section is more manufacturer friendly. Otherwise, the manufacturer will have to custom build each 16. The fluid transport system of claim 6, where the source of fluid is a source of fluid hydrocarbons.

17. The fluid transport system of claim 6, where the source of fluid is a source of fluid chemicals.

18. The system of claim 2, where li is measured from a start of the start of the pipe run.

19. The system of claim 3, where li is measured from a start of the start of the pipe run.

20. The fluid transport system of claim 7, where l in said portion is measured from a start of the tubular pipe-system.

* * * * *